United States Patent [19]

White

[11] Patent Number: 5,875,093
[45] Date of Patent: Feb. 23, 1999

[54] ELECTRICAL DISTRIBUTION PANEL INTERIOR BASE ASSEMBLY

[75] Inventor: Percy A. White, Beaver, Pa.

[73] Assignee: Eaton Corporation, Cleveland, Ohio

[21] Appl. No.: 867,142

[22] Filed: Jun. 2, 1997

[51] Int. Cl.$^6$ .................................................. H02B 1/20
[52] U.S. Cl. .......................................... 361/637; 361/673
[58] Field of Search .................................... 200/295, 296; 361/627–628, 634–640, 644, 647, 652–655, 673, 825, 807–810

[56] References Cited

U.S. PATENT DOCUMENTS

| | | | |
|---|---|---|---|
| 3,346,777 | 10/1967 | Leonard et al. | 361/655 |
| 4,227,238 | 10/1980 | Saito | 200/296 |
| 4,667,268 | 5/1987 | Mrowtka | 361/673 |
| 4,740,865 | 4/1988 | Barner | 361/627 |
| 4,937,704 | 6/1990 | Link et al. | 361/673 |

*Primary Examiner*—Gregory Thompson
*Attorney, Agent, or Firm*—Martin J. Moran

[57] ABSTRACT

An electrical distribution panel interior base assembly includes a base member, brackets secured to the base member and bus bars mounted on the base member. The same type of base member is used to mount different types of conventional circuit breakers. Depending on the type of circuit breaker to be installed in the electrical distribution panel, different types of brackets and bus bars are used in the base assembly. The modular base assembly permits the same distribution panel enclosure to be used for various types of circuit breakers.

3 Claims, 6 Drawing Sheets

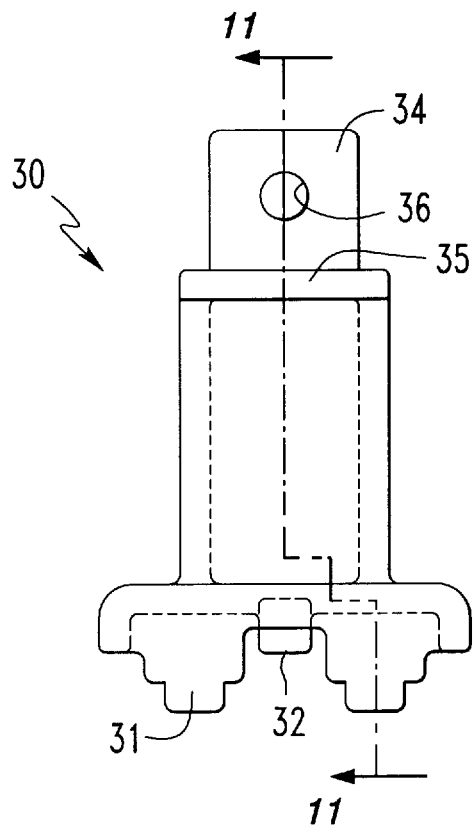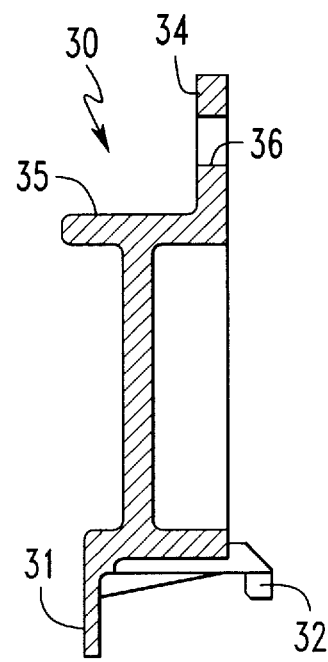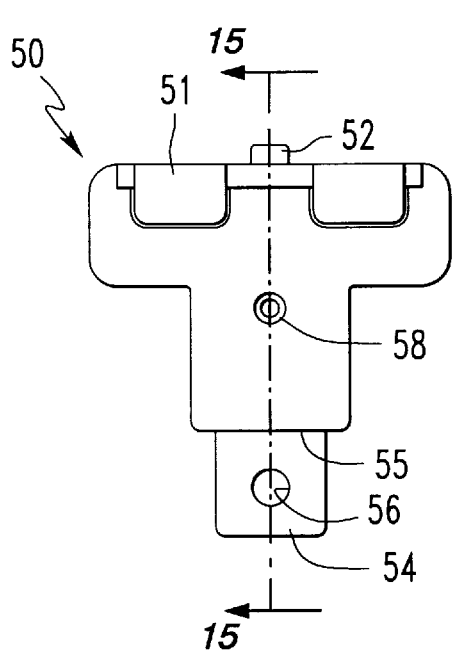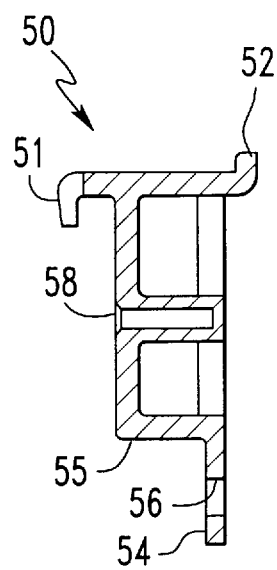
FIG. 10
FIG. 11
FIG. 14
FIG. 15

ELECTRICAL DISTRIBUTION PANEL INTERIOR BASE ASSEMBLY

FIELD OF THE INVENTION

The present invention relates to electrical distribution panels, and more particularly relates to an improved distribution panel interior base assembly which can be used with different types of circuit breakers.

BACKGROUND INFORMATION

Electrical distribution panels or load centers are used widely in residential and commercial applications. The distribution panels house electrical circuit breakers within an enclosure. Most residential and light commercial circuit breakers in current use have two different configurations. One type of circuit breaker has a ¾ inch wide case and includes hooks which are fastened over a support bracket attached to the rear of the enclosure. Another type of circuit breaker has a 1 inch wide case and includes heels which are inserted underneath a support clip attached to the rear panel of the enclosure. Due to the different types of circuit breakers conventionally used, prior art distribution panel enclosures have been designed differently depending on the particular type of circuit breaker to be mounted therein. The requirement for different types of distribution panel enclosures increases the number of enclosures that must be fabricated and inventoried, and prevents different types of circuit breakers from being used in the same enclosure.

The present invention has been developed in view of the foregoing and other deficiencies of the prior art.

SUMMARY OF THE INVENTION

The present invention provides an electrical distribution panel base assembly that is adaptable for use with different types of conventional circuit breakers. The base assembly includes a base member to which different types of brackets and bus bars are attached depending on the type of circuit breakers to be mounted in the panel.

An object of the present invention is to provide a base assembly for an electrical distribution panel including a base member, at least one bracket secured to the base member having means for mounting a circuit breaker thereon, and at least one bus bar mounted on the base member.

Another object of the present invention is to provide a base member for an electrical distribution panel base assembly including a portion for securing at least one circuit breaker-engaging bracket thereto, and a portion for mounting at least one bus bar thereon.

Another object of the present invention is to provide a bracket for mounting a circuit breaker in an electrical distribution panel including a first end having a portion for engagement with a circuit breaker, and a second end having a tab for securement to a base member.

These and other objects of the present invention will be more readily apparent from the following description.

BRIEF DESCRIPTION OF THE DRAWINGS

FIG. 10 is a front view of a retaining bracket for mounting ¾ inch circuit breakers in accordance with an embodiment of the present invention.

FIG. 11 is a sectional view of the bracket of FIG. 10.

FIG. 14 is a front view of a retaining bracket for mounting 1 inch circuit breakers in accordance with an embodiment of the present invention.

FIG. 15 is a sectional view of the bracket of FIG. 14.

DETAILED DESCRIPTION OF THE PREFERRED EMBODIMENTS

Figure 1:
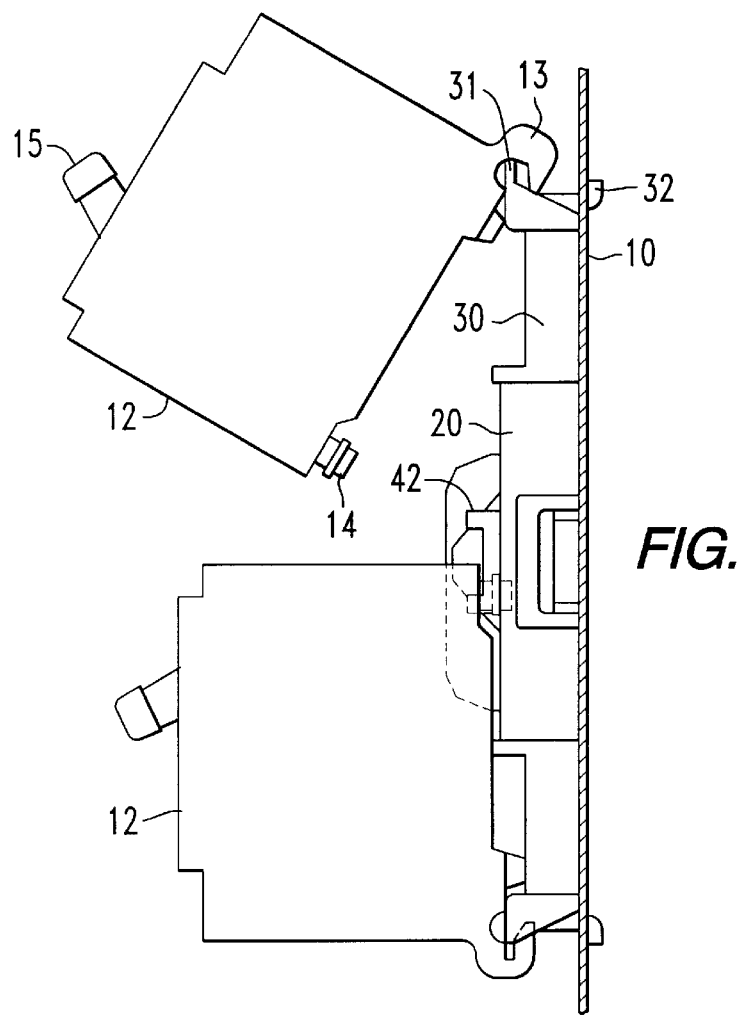
FIG. 1 is a side view of an electrical distribution panel interior base assembly for mounting circuit breakers with ¾ inch wide breaker poles in accordance with an embodiment of the present invention.

FIG. 1 is a plan view showing an electrical distribution panel interior base assembly mounted on the back panel 10 of an electrical distribution box. In this embodiment, conventional ¾ inch wide circuit breakers 12 are mounted on the base assembly by means of hook 13 at the load end of each circuit breaker. An electrical contact 14 at the line end of each ¾ inch circuit breaker engages an electrical bus member of the base assembly. Each circuit breaker 12 includes a switch handle 15.

Figure 2:
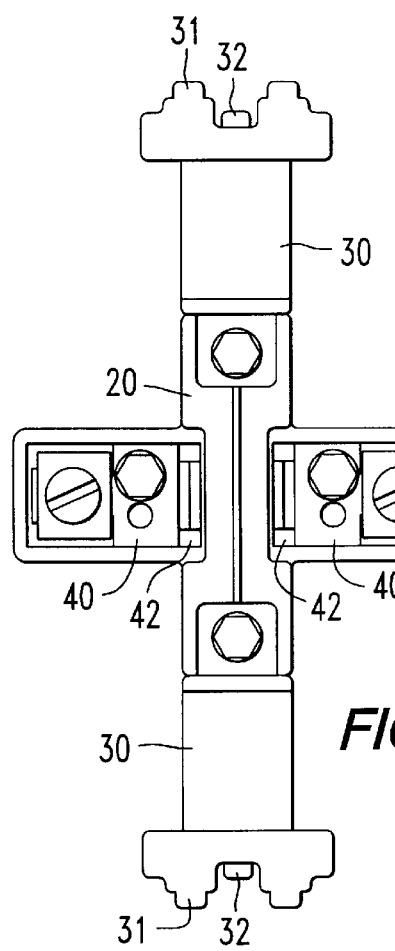
FIG. 2 is a front view of a four-circuit electrical distribution panel interior base assembly for mounting ¾ inch circuit breakers in accordance with an embodiment of the present invention.
Figure 3:
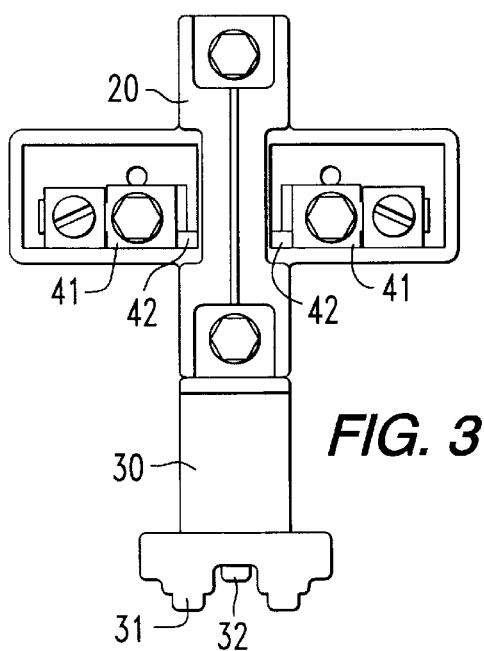
FIG. 3 is a front view of a two-circuit electrical distribution panel interior base assembly for mounting ¾ inch circuit breakers in accordance with an embodiment of the present invention.

As shown in FIGS. 1–3, the electrical distribution panel base assembly includes a base member 20 which secures brackets 30 to the back panel 10 of the distribution box. The brackets 30 are used to secure the ¾ inch circuit breakers 12 to the distribution panel by engagement with the hooks 13 at the load end of the circuit breakers, as more fully described below. In this embodiment, the base assembly also includes bus bars 40, 41 mounted on the base 20. In FIG. 2, the bus bars 40 are structured to receive four ¾ inch circuit breakers. In FIG. 3, the bus bars 41 are structured to receive two ¾ inch circuit breakers.

Figure 4:
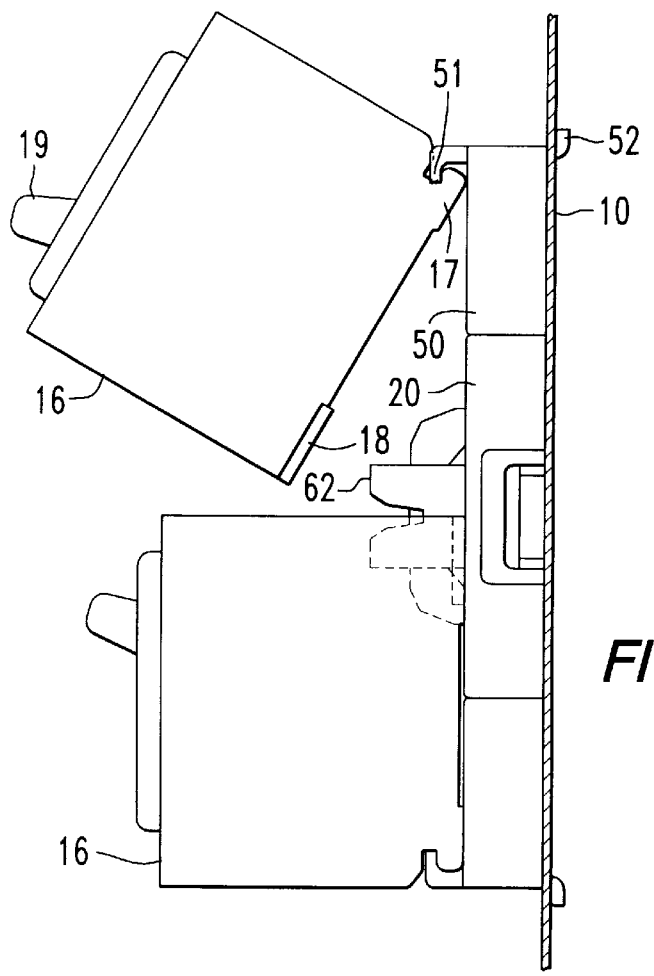
FIG. 4 is a side view of an electrical distribution panel interior base assembly for mounting circuit breakers with 1 inch wide breaker poles in accordance with another embodiment of the present invention.
Figure 5:
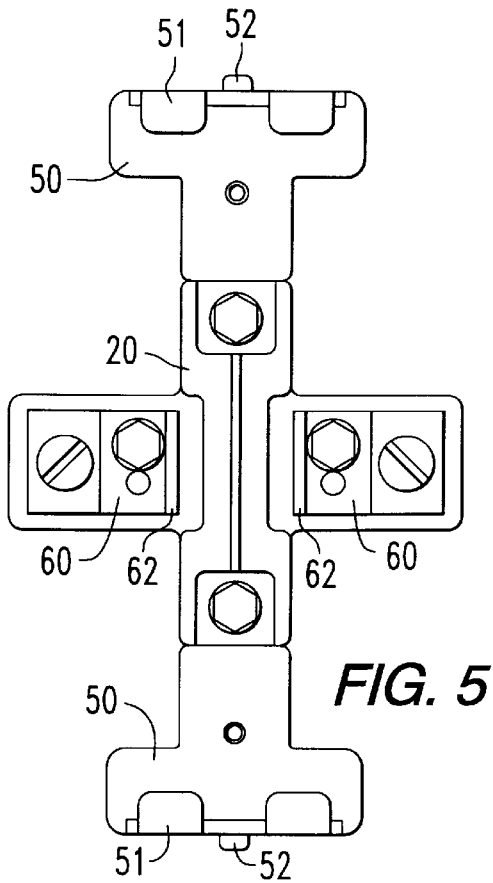
FIG. 5 is a front view of a four-circuit electrical distribution panel interior base assembly for mounting 1 inch circuit breakers in accordance with an embodiment of the present invention.
Figure 6:
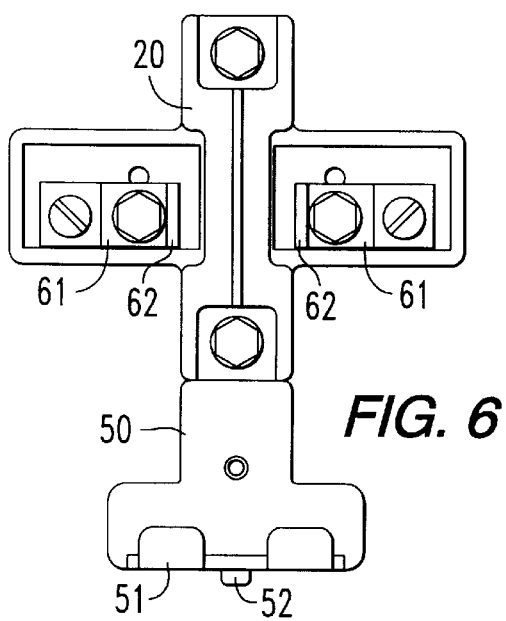
FIG. 6 is a front view of a two-circuit electrical distribution panel interior base assembly for mounting 1 inch circuit breakers in accordance with an embodiment of the present invention.

FIGS. 4–6 show another electrical distribution panel interior base assembly mounted on the back panel of an electrical distribution box 10. In this embodiment, conventional 1 inch wide circuit breakers 16 are mounted on the base assembly by means of a heel 17 at the load end of each circuit breaker 16. An electrical contact 18 at the line end of each circuit breaker 16 engages an electrical bus bar of the base assembly. Each circuit breaker 16 includes a switch handle 19.

In the embodiment shown in FIGS. 4–6, the base assembly includes a base member 20 which is preferably identical to the base member 20 shown in the embodiment of FIGS. 1–3. However, in the embodiment of FIGS. 4–6, different brackets 50 are secured to the back panel 10 of the electrical distribution box by the base 20. As more fully described below, the brackets 50 include clips for mounting the heels 17 of the 1 inch circuit breakers 16. The base assembly of this embodiment further includes bus bars 60, 61 mounted on the base 20. In FIG. 5, the bus bars 60 are structured for connection with four 1 inch circuit breakers. In FIG. 6, the bus bars 61 are structured for connection with two 1 inch circuit breakers.

Figure 7:
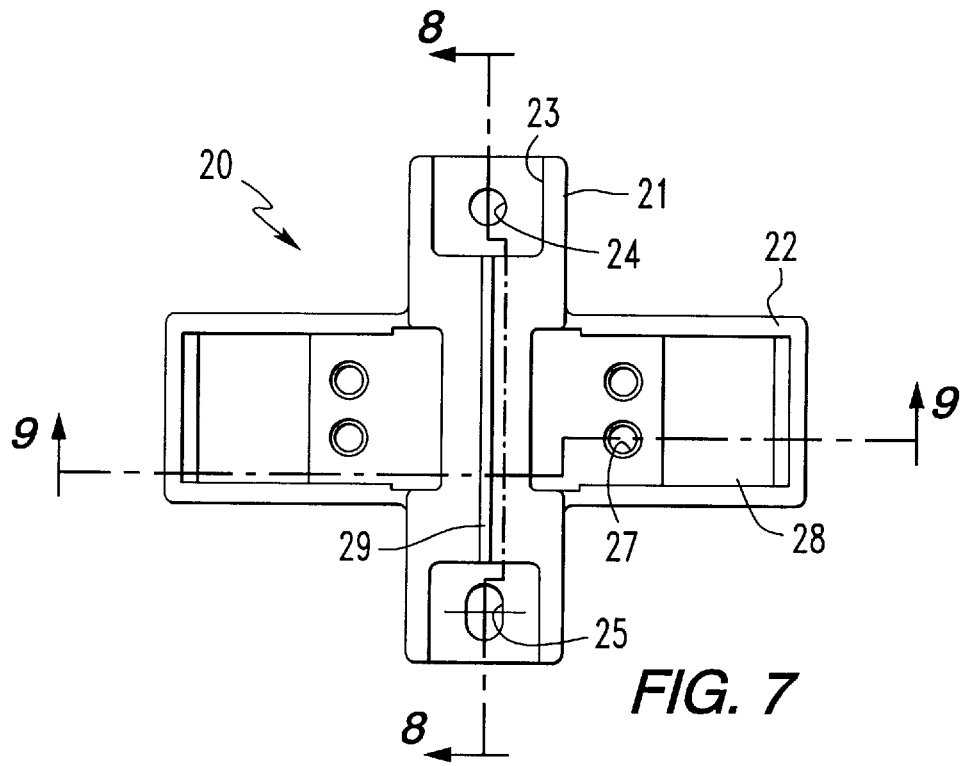
FIG. 7 is a front view of a base member suitable for mounting both ¾ inch and 1 inch circuit breakers in an electrical distribution panel in accordance with an embodiment of the present invention.
Figure 8:
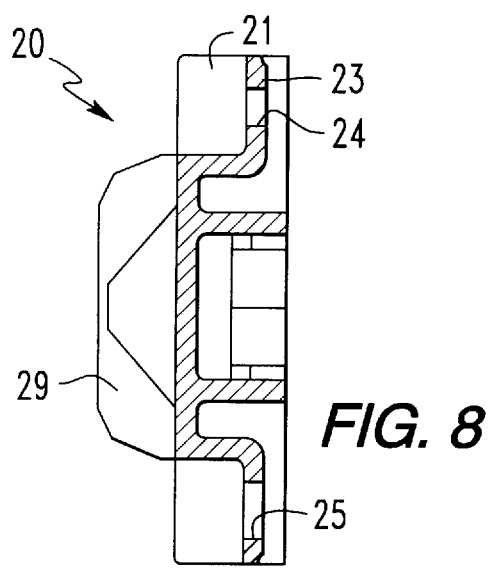
FIG. 8 is a sectional view of the base member of FIG. 7 along section lines 8—8 shown in FIG. 7.
Figure 9:
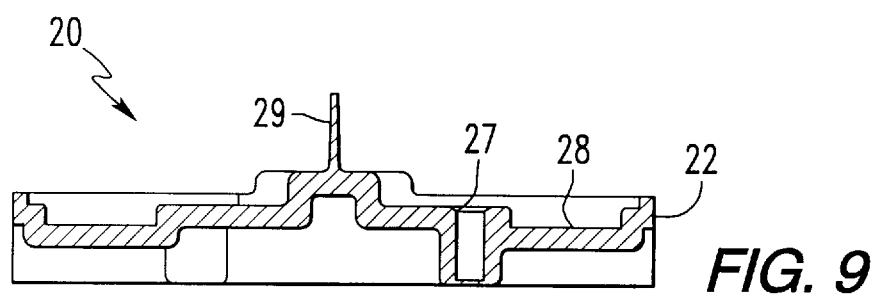
FIG. 9 is another sectional view of the base member of FIG. 7 along section lines 9—9 shown in FIG. 7.

FIGS. 7–9 illustrate a preferred base 20 suitable for mounting both ¾ inch and 1 inch circuit breakers in accordance with the present invention. The base 20 is generally cross-shaped with bracket-engaging arms 21 extending from the center of the base 20, and bus bar-engaging arms 22 extending from the base in a direction substantially perpendicular to that of the bracket-engaging arms. Each bracket-engaging arm 21 includes a slot 23 for engaging a tab of a retainer bracket, as more fully described below. The upper bracket-engaging arm 21 shown in FIGS. 7 and 8 includes a hole 24 in communication with the slot 23 for receiving a fastener (not shown). The lower bracket-engaging arm shown in FIGS. 7 and 8 includes an elongated hole 25 for receiving a suitable fastener (not shown). The base 20 is made of any suitable material such as polypropylene. As more fully described below, the bracket-engaging arms 21 of the base 20 are capable of securing different types of brackets 30, 50 within an electrical distribution panel depending on the type of circuit breaker to be mounted in the panel.

As shown in FIGS. 7 and 9, the bus bar-engaging arms 22 of the base 20 include multiple holes 27 for receiving bus bar-mounting fasteners (not shown). Although four holes 27 are shown in FIG. 7, the upper or lower holes may be replaced with extending pins which engage cut-outs or holes in the bus bars mounted thereon in order to facilitate mounting of the bus bars in the proper orientation. Each bus bar-engaging arm 22 includes a recess 28. The base 20 also includes a vane 29 which provides electrical spacing between bus bars in the assembled unit.

Figure 12:
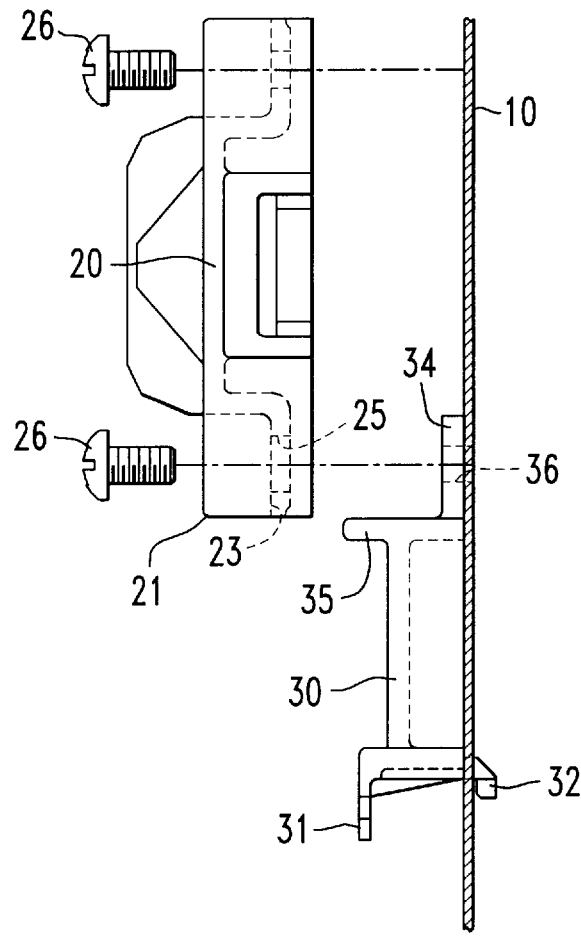
FIG. 12 is a side view showing the assembly of a base member and a retaining bracket for ¾ inch circuit breakers in accordance with an embodiment of the present invention.

FIGS. 10 and 11 show a preferred bracket 30 for mounting ¾ inch circuit breakers in accordance with an embodiment of the present invention. The bracket 30 includes extensions 31 structured for engagement with a hook 13 at the load end of a conventional ¾ inch circuit breaker 12, as shown in FIG. 1. The bracket 30 also includes a hook 32 structured to pass through an opening in the back panel 10 of an electrical distribution box, as shown in FIGS. 1 and 12. A tab 34 extends from one end of the bracket 30 and is adapted for engagement with the base 20, as more fully described below. A wall 35 extends substantially perpendicularly from the tab 34. A hole 36 extends through the tab 34. The bracket 30 is made of any suitable material such as polypropylene.

FIG. 12 illustrates the manner in which the bracket 30 is mounted to the back panel 10 by means of the base 20 to provide one type of interlocking connection in accordance with an embodiment of the invention. The hook 32 extending from the bracket 30 is inserted through a slot or opening in the back panel 10. The bracket-engaging arm 21 of the base 20 is positioned over the bracket 30, with the tab 34 received within the slot 23. The end of the bracket-engaging arm 21 abuts the wall 35 of the bracket 30. The hole 25 is aligned with the hole 36, and a suitable fastener 26 passes through the holes for securing the base 20 and bracket 30 together. The fastener extends through the back panel 10 of the distribution box. While not shown in FIG. 12, another bracket 30 may be secured to the back panel 10 at the upper end of the base 20 if it is desired to mount additional circuit breakers in the distribution panel. Each of the holes 24 and 25 may optionally include a flange (not shown) which extends into the slot 23 and is inserted in the hole 36 of each bracket.

Figure 13:
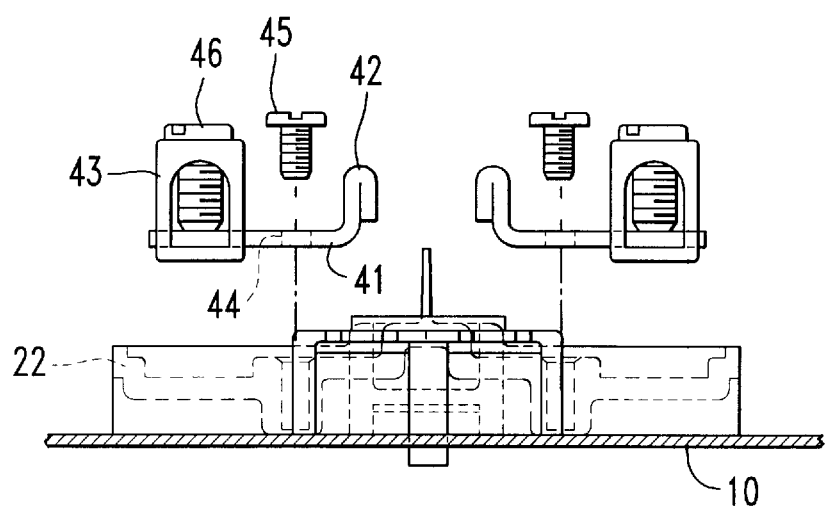
FIG. 13 is a top view showing the mounting of bus bars on a base member and retaining brackets to provide a base assembly for ¾ inch circuit breakers in accordance with an embodiment of the present invention.

FIG. 13 shows the details of preferred bus bars 41 adapted for electrical connection with ¾ inch circuit breakers, and also shows the manner in which such bus bars may be mounted on the remainder of the base assembly. Each bus bar 41 includes a stab 42 extending from one end thereof which is structured for engagement with the line end of a conventional ¾ inch circuit breaker. A lug 43 extends from an opposite end of the bus bar 41. A hole 44 is provided through the bus bar 41 for receiving a suitable fastener 45 which connects the bus bar to the bus bar-engaging arm 22 of the base. A lug screw 46 is provided for the connection of electrical wires within the distribution panel in a known manner. The bus bars are preferably made of a metal such as aluminum or copper.

Figure 16:
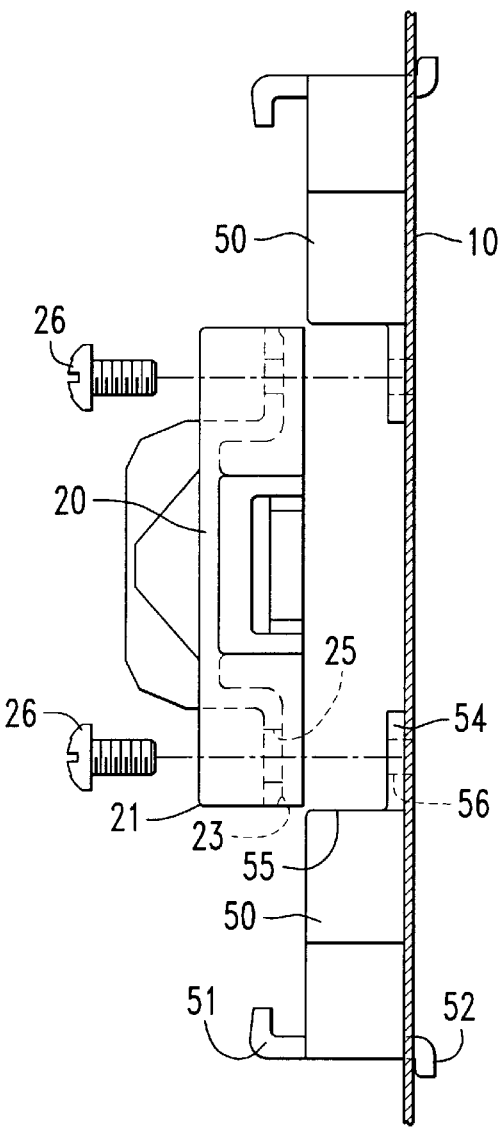
FIG. 16 is a side view showing the assembly of a base member and retaining brackets for 1 inch circuit breakers in accordance with an embodiment of the present invention.

FIGS. 14 and 15 show a preferred bracket 50 for mounting 1 inch circuit breakers in accordance with an embodiment of the present invention. The bracket 50 includes clips 51 configured for engagement with a heel 17 at the load end of a conventional 1 inch circuit breaker 16, as shown in FIG. 1. The bracket 50 also includes a hook 52 designed to pass through an opening in the back panel 10 of an electrical distribution box, as shown in FIGS. 4 and 16. A tab 54 extends from one end of the bracket 50 for engagement within a slot in the base 20, as more fully described below. A wall 55 extends substantially perpendicularly from the tab 54. A hole 56 extends through the tab 54. A self-threading hole 58 is provided in the bracket 50 for securing a 1 inch breaker to the assembly with a circuit breaker hold down screw (not shown). The bracket 50 is made of a material such as polypropylene.

FIG. 16 illustrates the manner in which each bracket 50 is mounted to the back panel 10 by means of the base 20 to provide one type of interlocking connection in accordance with an embodiment of the invention. The hook 52 extending from the bracket 50 is inserted through a slot or opening in the back panel 10. A bracket-engaging arm 21 of the base 20 is positioned over each bracket 50, with the tab 54 received within the slot 23. The end of the bracket-engaging arm 21 abuts the wall 55 of the bracket 50. The hole 25 is aligned with the hole 56, and a suitable fastener 26 passes through the hole for securing the base 20 and the bracket 50 together. The fastener 26 extends through the back panel 10. While two brackets are shown in FIG. 16, it is also possible to secure only one bracket to the back panel 10 if desired.

Each of the holes 24 and 25 may optionally include a flange extending into the slot 23 which is inserted in the hole 56 of each bracket.

Figure 17:
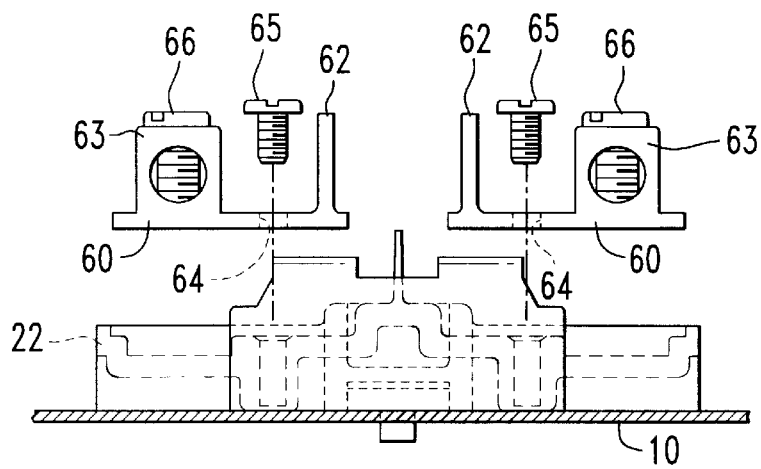
FIG. 17 is a top view showing the mounting of bus bars on a base member and retaining brackets to provide a base assembly for 1 inch circuit breakers in accordance with an embodiment of the present invention.

FIG. 17 shows the details of preferred bus bars 60 adapted for electrical connection with 1 inch circuit breakers, and also shows the manner in which such bus bars may be mounted on the remainder of the base assembly. Each bus bar 60 includes a stab 62 extending from one side thereof which is designed for engagement with the line end of a conventional 1 inch circuit breaker. A lug 63 extends from an opposite end of the bus bar 60. A hole 64 receives a fastener 65 for connection of the bus bar 60 to the bus bar-engaging arm 22 of the base. A lug screw 66 is provided for the connection of electrical wires within the distribution panel in a known manner. The bus bars are preferably made of aluminum or copper.

The electrical distribution panel interior base assembly of the present invention provides several advantages over conventional designs. A single base member, such as base 20 shown in FIGS. 7–9, is used to mount both ¾ inch and 1 inch circuit breakers. Depending on the type of circuit breaker to be used, a specific type of retainer bracket is installed as part of the base assembly. For example, for ¾ inch circuit breakers, brackets as shown in FIGS. 10–12 may be installed. Alternatively, for 1 inch circuit breakers, brackets as shown in FIGS. 14–16 may be installed. The type of bus bar used in the assembly is also dependent on the type of circuit breaker to be mounted in the panel. For example, bus bars as shown in FIG. 13 may be used for ¾ inch circuit breakers, while bus bars as shown in FIG. 17 may be used for 1 inch circuit breakers. The modular base assembly design of the present invention allows a single electrical distribution panel enclosure to be used for both ¾ inch and 1 inch circuit breakers as well as two or four circuit devices, thereby reducing the number of enclosure types that must be fabricated, and allowing different types of circuit breakers to be used in the same enclosure. This reduces the amount of inventory that must be carried, and also allows greater flexibility for the installation of various types of circuit breakers.

While certain embodiments of the present invention have been described herein, it is to be understood that various modifications, changes, additions and adaptations are within the scope of the invention, as set forth in the following claims.

What is claimed is:

1. A base assembly for an electrical distribution panel comprising:

a base member;

at least one bracket secured to the base member including means for mounting a circuit breaker thereon;

at least one bus bar mounted on the base member;

wherein the at least one bracket is interlockingly connected to the base member;

wherein the base member includes a slot and the at least one bracket includes a tab at least partially inserted in the slot; and wherein the base member includes a bracket-engaging arm and the at least one bracket includes a wall extending substantially perpendicularly from the tab in contact with the bracket-engaging arm.

2. A base assembly for an electrical distribution panel comprising:

a base member;

at least one bracket secured to the base member including means for mounting a circuit breaker thereon;

at least one bus bar mounted on the base member; and wherein the at least one bracket includes a hook for engagement with a wall of the electrical distribution panel.

3. The base assembly of claim 2, wherein the at least one bracket is secured to the base member by a fastener which also secures the at least one bracket and the base member to the wall of the electrical distribution panel.

* * * * *